Oct. 30, 1956 J. STROTHER 2,769,032

TELEPHONE ALARM

Filed March 12, 1951 2 Sheets-Sheet 1

INVENTOR.
John Strother,
BY Victor J. Evans & Co.
ATTORNEYS

TELEPHONE ALARM

Filed March 12, 1951

2 Sheets-Sheet 2

INVENTOR.
John Strother,
BY Victor J. Evans & Co.
ATTORNEYS

United States Patent Office 2,769,032

Patented Oct. 30, 1956

2,769,032

TELEPHONE ALARM

John Strother, New York, N. Y.

Application March 12, 1951, Serial No. 215,089

3 Claims. (Cl. 179—5)

This invention relates to alarm devices of the type used as burglar alarms in residences and particularly of the type adapted to automatically send an alarm to a police station or the like, and in particular this invention relates to a signal sending instrument which, upon closing a circuit opens the circuit of a telephone by elevating the hand key, dials a number, such as the number of a police station, and sends a message giving the address or the like.

The purpose of this invention is to provide a burglar alarm system whereby a person in a bed or located at a point remotely positioned in relation to the telephone may send an alarm to a police station through the telephone by pressing a button.

Various types of alarm devices have been provided for sending alarms to police or other central stations by means of a telephone circuit, however, it is difficult to connect an alarm device to a telephone without changing the structure of the telephone instrument. With this thought in mind this invention contemplates an attachment adapted to be installed upon a telephone instrument without changing the design or construction of the telephone and which operates through the conventional dialing system and mouthpiece and receiver.

The object of this invention is, therefore, to provide means for constructing a burglar alarm device whereby it may readily be attached to a telephone instrument without modifying the instrument.

Another object of the invention is to provide an alarm device for use in combination with telephone instruments with which it is possible to dial a number and send a message without manually engaging the instrument.

A further object of the invention is to provide a burglar alarm device for telephone instruments which is of a comparatively simple and economical construction.

With these and other objects and advantages in view the invention embodies a solenoid actuated cradle positioned to elevate the handpiece of a telephone instrument, a dialing device for actuating the dial of the instrument and a phonograph for providing a message to the mouthpiece of the telephone instrument.

Other features and advantages of the invention will appear from the following description taken in connection with the drawings wherein.

Figures 1, 9:
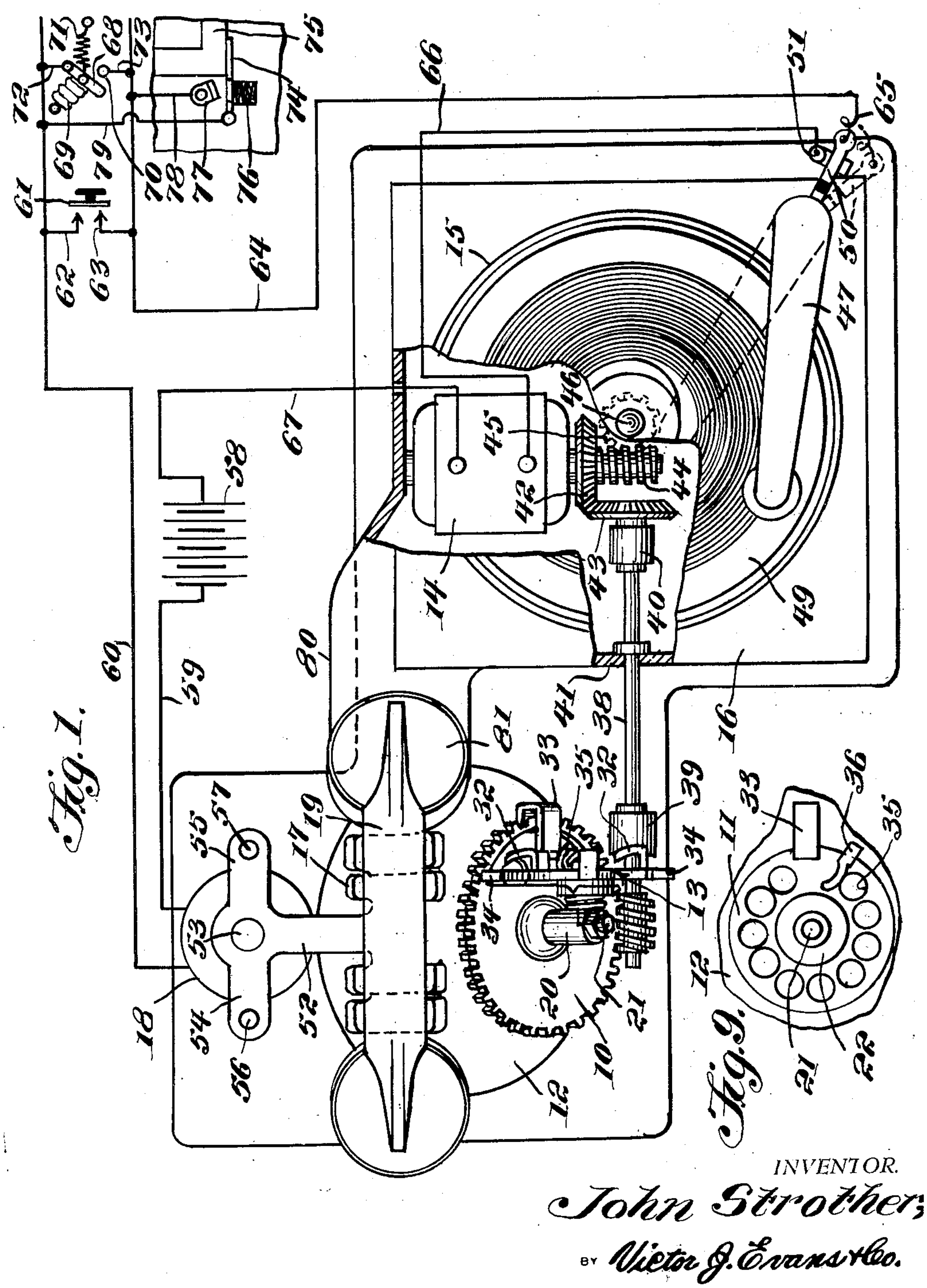
Figure 1 is a combination plan and diagrammatic view with parts broken away illustrating an alarm device in combination with a telephone instrument.
Figure 9 is a view showing the dialing disc of a telephone instrument with a trip added at one side of the disc and positioned to actuate the dialing wheel for tripping the wheel, and also the conventional finger stop of the instrument.

Referring now to the drawings wherein like reference characters denote corresponding parts the improved telephone alarm of this invention includes a dialing gear 10 positioned above the conventional finger dialing disc 11 of a telephone instrument 12, a wheel 13 carried by the dialing gear and positioned to actuate the disc 11, a motor 14 for driving the gear 10 and which is also provided with means for rotating a turntable 15 of a phonograph 16, and a cradle 17 that is actuated by a solenoid 18 to elevate a handpiece 19 of the telephone instrument.

The gear 10 is provided with an elongated hub 20 through which it is journaled on a post 21 extending upwardly from the centrally positioned hub 22 of the telephone instrument 12, and with the gear journaled on the post, it is free to rotate without rotating the conventional finger disc 11.

Figures 2, 3, 4, 5, 6, 7, 8:
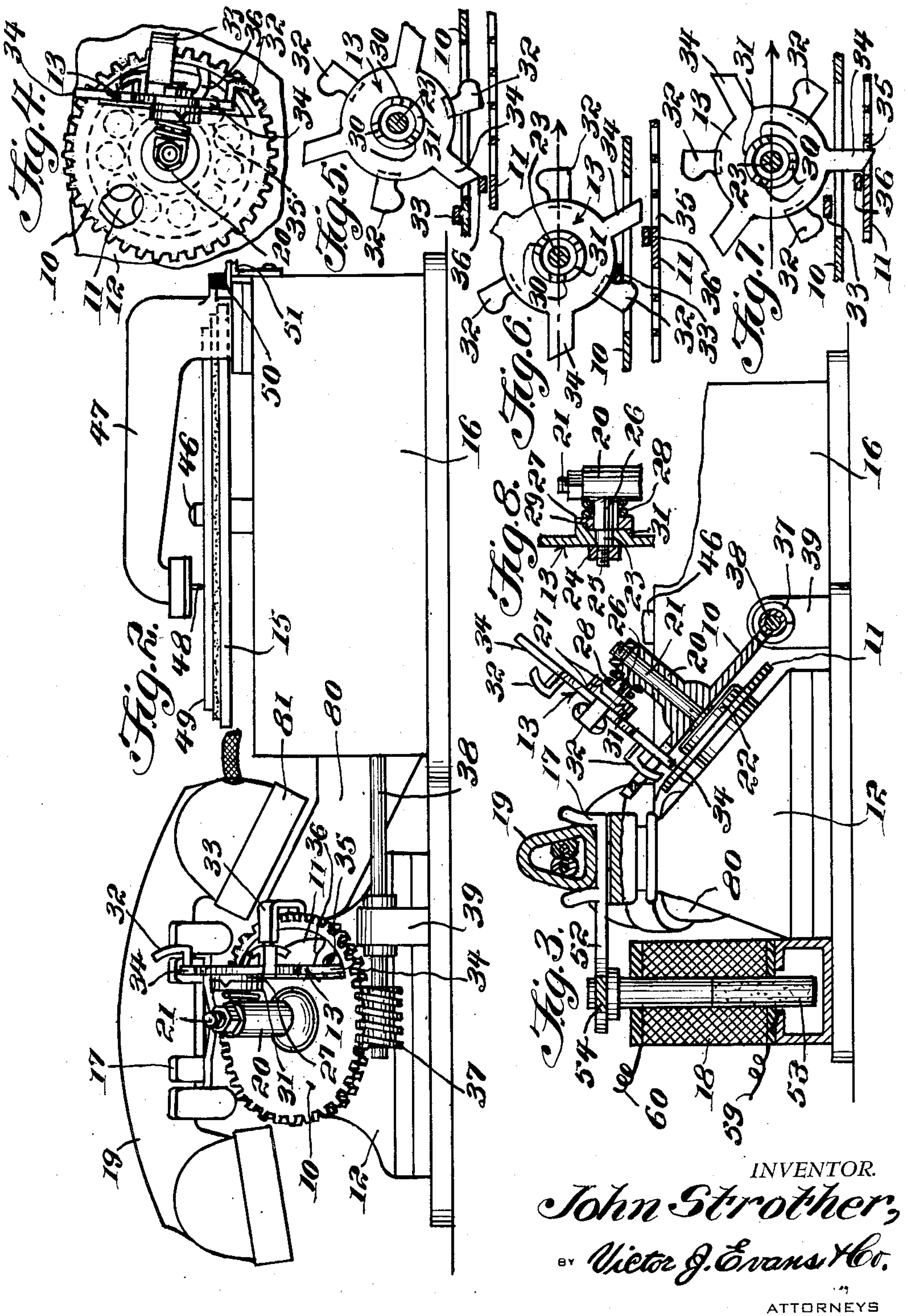
Figure 2 is a front elevational view showing the telephone instrument, phonograph, and dialing device.
Figure 3 is an end elevational view looking toward the instrument with parts broken away and shown in section.
Figure 4 is a detail illustrating a dialing wheel and gear positioned above the conventional dialing disc of a telephone instrument.
Figure 5 is a detail showing a section through the gear and dialing disc illustrating one of the dialing fingers in the position of leaving the disc.
Figure 6 is a similar view showing one of the fingers in the position of entering the disc.
Figure 7 is a similar detail showing one of the fingers extended through the disc.
Figure 8 is a detail showing the clutch mounting of the dialing wheel on the upper end of the post carried by the dialing gear.

As illustrated in Figures 3 and 8 the wheel 13 is journaled on a stud 23 which extends from the upper end of the hub 20 and the wheel is secured in position by a lock nut 24 on a threaded end 25 of the stud. The stud is also provided with a section 26 having flat sides and a clutch ring 27, positioned on the section 26 is resiliently held outwardly by a spring 28. The clutch ring 27 is provided with notches 29 that receive projections 30 of a clutch collar 31 carried by the wheel 13 and as illustrated in Figure 8 the wheel 13 is frictionally held whereby rotation thereof is prevented until a trip, as indicated by the numeral 32, on the wheel engages a clip 33 on the instrument base.

The wheel 13 is provided with fingers 34 that are positioned to extend through an opening 5 in the gear and into the finger openings 35 of the dialing disc 11 of the telephone instrument, as illustrated in Figures 5, 6 and 7 and when one of the trips 32 engages the clip 33 the following finger 34 passes downwardly through one of the finger openings 35 of the dialing disc 11 whereby the disc 11 is carried with the gear 10 until the finger extended through the opening in the disc 11 engages the finger stop 36 on the instrument 12. At this time the wheel 13 is rotated from the position shown in Figure 7 to that shown in Figure 5, wherein the fingers and trip 32 are positioned to travel freely until the trip 32 again engages the clip 33.

In this position the dialing disc 11 is free to return to the original position. At the completion of this operation a signal is sent to the operator and with several additional operations signals may be sent to a police station or other central station, as may be desired.

The gear 10 is rotated by a worm 37 on a shaft 38 that is mounted in bearings 39 and 40 and the shaft, which extends through a wall 41 of the phonograph 16 is driven from the motor 14 by beveled gears 42 and 43.

The motor 41 is also provided with a worm 44 that meshes with a gear 45 on the vertical shaft 46 of the turntable 15 whereby the turntable is rotated by the motor.

The phonograph is also provided with a needle carrying arm 47 and a needle or point 48 carried by the arm is positioned to engage a record 49 on the turntable 15.

The arm 47 is provided with a contact arm 50 which, as illustrated in Figure 1, is positioned to engage a contact 51 to close a switch through the motor operating circuit when the arm 47 is in the position shown in full lines in Figure 1 and which is positioned to break the circuit when the arm reaches the position shown in dotted lines. By this means a message may be sent through the telephone for a predetermined period of time.

The cradle 17, which elevates the handpiece 19 of the telephone instrument is carried on the outer end of an arm 52 which extends from a core 53 of the solenoid 18 and, as illustrated in Figure 1, the upper end of the core is provided with laterally disposed arms 54 and 55 that are slidably mounted on guide posts 56 and 57 whereby the core of the solenoid with the arm 52 travel vertically upwardly and downwardly.

The alarm circuit is supplied with current from a battery 58, one terminal of which is connected by a wire 59, to one terminal of the solenoid 18 and the opposite terminal of the solenoid is connected by a wire 60 to a terminal of a switch 61 by which a circuit may be completed to the solenoid and motor. The wire 60 is connected to a terminal 62 of the switch and an opposite terminal 63 is connected by wires 64 through the terminal 65 in the end of the contact arm 50 on the phonograph arm 47. The contact 51, that is positioned to be engaged by the arm 50 is connected by a wire 66 on one terminal of the motor 14, the opposite terminal of the motor being connected to the battery 58 by a wire 67.

The circuit may also be completed in case of fire, by a switch, as illustrated in Figure 1 wherein an arm 68 is retained in the open position by a fusible element 69 and upon fusing of the element 69 the arm 68 is drawn against a contact 70 by a spring 71. The arm is connected to a wire 60 by a wire 72 and the contact 70 is connected to the wire 64 by a wire 73.

The circuit may also be completed to send the alarm by the opening of a window, wherein a contact arm 74 is positioned in a window frame whereby the arm is held downwardly by a sash 75 and upon raising the sash the arm is sprung upwardly by a spring 76 so that it engages a contact 77. The contact 77 is connected to the wire 64 by a wire 78 and the arm 74 is connected to the wire 60 by a wire 79.

With the parts arranged in this matter the occupant of a residence or other building may, when it is determined that an intruder has entered the premises, press a button and send an alarm through the telephone without making a sound and without approaching the telephone.

With switches or buttons positioned at different points throughout a building and also with the fusible elements located in different critical positions an alarm may readily be sent to warn of the danger.

Upon completion of the circuit the motor is started and the solenoid energized whereby the cradle 17 elevates the handpiece 19 and the record 49 is rotated to provide the message which is conveyed by a horn 80 to the mouthpiece 81 of the handpiece 19. At the same time the gear 10 is rotated so that wheel 13 is actuated and the dialing disc 11 rotated to call the operator or dial a suitable number, such as the number of a police station.

Upon completion of the operation a circuit is broken by the arm 50, which passes away from the contact 51 and the solenoid is deenergized so that the parts return to their normal positions.

It will be understood that modifications may be made in the design and arrangement of the parts without departing from the spirit of the invention.

What is claimed is:

1. In a telephone dialing attachment, the combination which comprises a post adapted to be mounted on a stationary portion at the center of a telephone dial, said dial including a finger actuated disc having spaced openings for receiving the tips of fingers therein, a gear having a hub positioned above the dial of the instrument with the post extended through said hub providing means for journaling the gear on the instrument, said gear having an opening therethrough, a stud carried by and extended from one side of the hub of the gear, a wheel having radially disposed arms extended therefrom journaled on said stud, the opening of said gear being positioned whereby the arms of the wheel extend through the opening and into finger receiving openings of the disc, a clutch on the stud positioned between the wheel and hub of the gear for preventing rotation of the wheel whereby upon rotation of the gear the finger disc of the dial is carried therewith, means for rotating the gear, and means for actuating the clutch to release said wheel.

2. In a telephone dialing attachment, the combination which comprises a post adapted to be mounted on a stationary portion at the center of a telehone dial, said dial including a finger actuated disc having spaced openings for receiving the tips of fingers therein, a gear having a hub positioned above the dial of the instrument with the post extended through said hub providing means for journaling the gear on the instrument, said gear having an opening therethrough, a stud carried by and extended from one side of the hub of the gear, a wheel having radially disposed arms extended therefrom journaled on said stud, the opening of said gear being positioned whereby the arms of the wheel extend through the opening and into finger receiving openings of the disc, a clutch on the stud positioned between the wheel and hub of the gear for preventing rotation of the wheel whereby upon rotation of the gear the finger disc of the dial is carried therewith, means for actuating the clutch to release said wheel, a shaft having a worm gear thereon positioned whereby the worm gear meshes with the gear of the dial, a motor operatively connected to said shaft, and a switch for completing a circuit to the motor.

3. In a telephone dialing attachment, the combination which comprises a post adapted to be mounted on a stationary portion at the center of a telephone dial, said dial including a finger actuated disc having spaced openings for receiving the tips of fingers therein, a gear having a hub positioned above the dial of the instrument with the post extended through said hub providing means for journailing the gear on the instrument, said gear having an opening therethrough, a stud carried by and extended from one side of the hub of the gear, a wheel having radially disposed arms extended therefrom journaled on said stud, the opening of said gear being positioned whereby the arms of the wheel extend through the opening and into finger receiving openings of the disc, a clutch on the stud positioned between the wheel and hub of the gear for preventing rotation of the wheel whereby upon rotation of the gear the finger disc of the dial is carried therewith, means for actuating the clutch to release said wheel, a shaft having a worm gear thereon positioned whereby the worm gear meshes with the gear of the dial, a motor operatively connected to said shaft, a switch for completing a circuit to the motor, and a solenoid connected in the motor circuit and adapted to elevate a hand piece of an instrument upon which the telephone dial is positioned upon completing of the circuit to the motor.

References Cited in the file of this patent

UNITED STATES PATENTS

| | | |
|---|---|---|
| 1,557,373 | Sindt | Oct. 13, 1925 |
| 1,627,612 | Luse | May 10, 1927 |
| 1,799,512 | Haynes | Apr. 7, 1931 |
| 2,161,525 | Mountstephen | June 6, 1939 |
| 2,188,055 | Marsh et al. | Jan. 23, 1940 |